United States Patent [19]

Schulze

[11] 3,764,987

[45] Oct. 9, 1973

[54] METHOD OF AND APPARATUS FOR CODE DETECTION

[75] Inventor: Fritz H. Schulze, St. Paul, Minn.

[73] Assignee: Comten, Inc., St. Paul, Minn.

[22] Filed: Mar. 17, 1972

[21] Appl. No.: 235,567

[52] U.S. Cl. .................................. 340/172.5, 179/15

[51] Int. Cl. .................................................. H04j 3/06

[58] Field of Search ....................... 340/172.5; 179/15

[56] References Cited

UNITED STATES PATENTS

| | | | |
|---|---|---|---|
| 3,235,661 | 2/1966 | Oxley et al. | 340/172.5 |
| 3,045,212 | 7/1962 | Johnson | 340/172.5 |
| 2,952,732 | 9/1960 | Wright et al. | 340/172.5 |

*Primary Examiner*—Gareth D. Shaw
*Attorney*—Alfred E. Hall

[57] ABSTRACT

A method of and means for signal communication in which signals representative of a special condition are transmitted as a bit stream pattern comprising M sub-patterns which are each N bits long and each of which comprise N−1 bits of a first state and one bit of a second state. A said bit stream pattern is detected by a detector comprising a sub-pattern detection register for registering consecutive bits of a bit stream, a sub-pattern counter register for counting M detections of a sub-pattern, and register control means for controlling the detection and counter registers such that the counter register is updated to a count of M only by a bit stream of at least M sub-patterns.

8 Claims, 3 Drawing Figures

METHOD OF AND APPARATUS FOR CODE DETECTION

BACKGROUND AND FIELD OF THE INVENTION

This invention relates in general to code detection, in particular to detection of repetitive sub-patterns within a code pattern, and relates specifically to detection of a predetermined number of repetitions of a subpattern which comprises one or more complete or partial data processing type binary coded characters.

Repetitions of a sub-pattern are used in a data processing applications to specify special operations which because of their importance must be communicated with a higher degree of reliability than normal instructions, data, or commands.

One data processing application which is particularly dependent upon reliable communication of special operations is an application which includes a data processor located in a physically remote site, operated continuously for 24 hours of each day, and unattended by an operator but instead controlled from another site, perhaps by another processor (a "master" processor). It is important that certain key commands sent to the former processor (a "remote" or "slave" processor) be received by the remote processor with an exceptional degree of reliability.

One such key command is the command known as an "INITIAL LOAD" (IL) command. For an IL command, reliability is used in both the sense that an IL command be correctly carried out, and in the sense that erroneous generation of an IL command should virtually never occur, for an IL command stops and master clears the processor. Unintended master clearing of the processor likely would result in permanent loss of data essential to successful execution of the program being executed. Consequently, it is highly important that the IL command format and detection means virtually preclude erroneous generation of an IL command.

BRIEF SUMMARY OF INVENTION

Briefly, the present invention comprises means for and a method of transmitting both important data representative of a special condition and normal data over the same communication path. By transmitting a pattern representative of a special condition as a pattern of M sub-patterns each of which are N bits long and each of which comprise N−1 bits of a first state and one bit of a second state, wherein M and N are both integer numbers, and M is at least 2, special condition data patterns are reliably distinguished from normal data. The means for implementing such special condition detection in a receiver need only comprise a pair of registers and register control means. A transmitter for generating the special condition pattern may comprise any of a variety of well known transmitters and means for controlling operation thereof. For example, the transmitter may be a magnetic tape transmitter, the control means being an appropriately recorded tape.

According to a preferred embodiment, the detector basically comprises a pair of counters and a few control gates. One register, a sub-pattern detection register, includes a counter which when updated to its "full" count, registers a count of N−1 and provides the state of the data line as the last received bit of the N bit group registered therein. The sub-pattern detection register count is updated by each first state bit. A series of N−1 consecutive first state bits updates the sub-pattern detection register to its full count of N−1. The register control means is responsive to a sub-pattern detection register full count of N−1 to update the count of the second counter, a sub-pattern counter register, provided at the time of such N−1 count occurring the bit on the data line is of a second state. If the data line bit is not at a second state at the time of an N−1 detection register count, a condition resulting from receipt of a series of N, rather than N−1, consecutive first state bits, the sub-pattern counter register is cleared. Such an embodiment is particularly well suited for a data processing application. By using a sub-pattern counter register which has a relatively large maximum count, and by utilizing the counter register maximum count as an indication of detection of a special condition, this, coupled with a combination of a pattern and a pattern detector such that the detector is self synchronizing with the pattern, that is it synchronizes with the pattern independent of any control signals from either the transmitting and receiving device, a method of and means for special condition detection are provided which may be readily coupled to an input/output (I/O) channel of a data processor and may be operated continuously irrespective of the activity on the I/O channel, be it transmission of normal data or otherwise, to provide reliable and economical detection of a special operation such as an initial load.

DETAILED DESCRIPTION OF DRAWINGS

Figure 1:
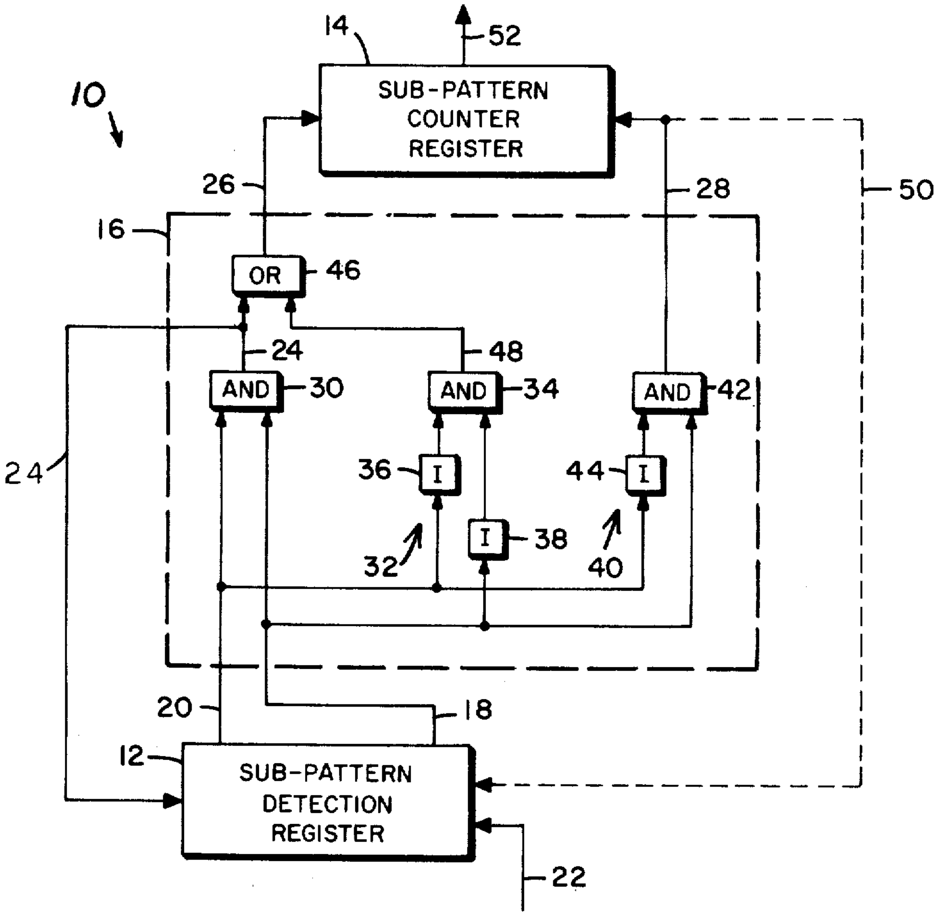
FIG. 1 is a basic logic diagram of an embodiment of the present invention illustrating an arrangement of a pair of registers and register control logic which detect repetitive sub-patterns consisting of N−1 bits of a first state and one bit of a second state.

Referring now to FIG. 1, a two register pattern detector according to the present invention is shown generally as 10. As shown, pattern detector 10 comprises a sub-pattern detection register 12, a sub-pattern counter register 14 and register control logic 16. Output leads 18 and 20 from register 12 are coupled as inputs to the register control logic 16. The serial input to register 12 is a data line 22. At each instant in time, lead 18 represents the registration, i.e., bit state of the most recently received bit and lead 20 represents the registration of the immediately preceding N−1 bits, the combination of leads 18 and 20 thus providing to register control logic 16 a registration of the N most recently received bits of a bit stream. A single lead 20 may be employed as an indication of the state of a plurality of bits. As previously described, each sub-pattern consists of two parts. All bits of one part are the same, the part of N−1 consecutive first state bits. A total of N−1 bits can therefore be considered to have a collective state; namely, a collective first state when all N−1 bits simultaneously are of a first state and a collective second state when one or more of the N−1 bits are of a second state. Register control logic 16 is shown to have three outputs signified by output leads 24, 26, and 28. Register control logic 16 is shown to comprise a first coincidence circuit, AND gate 30, a second coincidence circuit shown generally as 32 and comprised of AND gate 34 and inverters 36 and 38, and an anticoincidence circuit shown generally as 40 and comprised of AND gate 42 and inverter 44. The dual inputs to each of coincidence circuits 30 and 32 and to the anticoincidence circuit 40 are the detection register 12 output leads 18 and 20. As explained previously, lead 18 represents the state of the most recently received bit, the *n*th bit, and lead 20 the collective state of the N−1 bits immediately preceding the Nth bit (the "preceding" bits) of a group of N registered bits. As also previously stated, N−1 consecutive bits of a sub-pattern are of a first state and the one remaining bit is of a second state. The state of lead 18 of course corresponds to the state of the Nth received bit of the registered group; the state of the lead 20 is the second state if any of the N−1 "preceding" bits was a second state but is a first state if and only if the "preceding" bits were all of the first state.

Whenever the states of leads 18 and 20 are anticoincident with a first state signal on lead 20 and a second state signal on lead 18, indicating registration of a sub-pattern, i.e., indicating detection of N−1 consecutive first state bits followed by detection of a second state bit, anticoincidence circuit 40 is active to couple a signal via lead 28 to an input of sub-pattern counter register 14 and thereby update the counter. If detection register 12 does not clear itself to zero upon detection of a sub-pattern, the anticoincidence circuit 40 output also clears detection register 12 as signified by the dashed line 50.

Coincident occurrence of first state signals on leads 18 and 20, indicating registration of N first state bits, activates coincidence circuit 32 to produce an output which is coupled to OR gate 46 via lead 48 resulting in an output from OR 46 via lead 26 to the clear input of counter register 14.

Coincident occurrence of second state signals on leads 18 and 20, indicating registration of a second state Nth bit which was preceded by fewer than N−1 first state bits, similarly couples an output signal from OR 46 to clear counter register 14 as a result of activating the AND 30 first coincidence circuit. Activation of AND 30 also clears detection register 12 as a result of an output on lead 24. In summary, the register control 16 provides a counter update signal on lead 28 when a subpattern is detected and provides a counter clear signal in response to either of two conditions each occurring when a detection of a series of bits is inconsistent with a subpattern. One of these two latter conditions is a series of bits equal in length to a sub-pattern (N bits) which fails to include a second state bit as the Nth bit of the series. Such a series of bits activates coincidence gate 34 to provide a counter clear signal to counter 14; since both lead 18 and lead 20 are carrying second state signals. The other condition is a series of bits, including a series less than a sub-pattern, which includes two second state bits. Such a series activates coincidence gate 30 to provide a counter clear signal, not only to counter 14 but to counter 12 as well. From the foregoing description of the operation of the coincidence and anticoincidence circuits of register control 16 and their control of registers 12 and 14, it follows that each registration of a sub-pattern in detection register 12 updates counter register 14 and that only a succession of consecutive sub-patterns will update counter register 14 to its predetermined count, conveniently its maximum count which corresponds to the previously referred to "M" subpatterns. Upon reaching its predetermined count, register 14 provides an output on lead 52 to indicate detection of a pattern.

Figure 2:
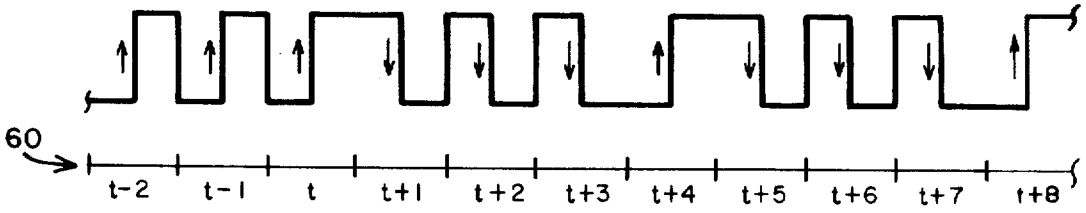
FIG. 2 is a signal waveform representative of normal data and a pattern which comprises repetitive sub-patterns of N−1 bits of a first state and one bit of a second state.

Referring now to FIG. 2, a signal waveform representation of normal data and a pattern which comprises repetitions of sub-patterns of 2N−1 consecutive bits of a first-state and one bit of a second state is shown. In the figure, to simplify the drawing, the sub-pattern length is illustrated as four bits. In actual practice, use of a longer pattern can reduce the liklihood of erroneous generation of a pattern. E.g., in an application in which data is transmitted as a fixed length character with a parity bit, by using a sub-pattern two characters long, one-half of the subpattern is certain to have incorrect parity. The liklihood of every other, and only every other, character of a normal data transmission being received with incorrect parity further reduces the liklihood of inadvertent generation of a special condition pattern. In FIG. 2, the waveform represents the signal of a synchronous data transmission. As is well known, the bit state of each bit of such a transmission is indicated by a transition of the signal from one state to another in the middle of the bit time, direction of the transition being representative of the state. In FIG. 2, a "first" state corresponds to a downward transition and a "second" state corresponds to an upward transition. The waveform illustrates the start of a pattern in the midst of normal data, specifically following two normal data second state bits. A bit time reference shown generally as 60 indicates that the three normal data second state bits T occur at times T−1 and T−2, that the first sub-pattern occurs during bit times T+1 through T+4, the second sub-pattern during bit times T+5 through T+8, the latter of which bits is only partially shown. One of ordinary skill in the art will appreciate that the waveform of FIG. 2 is converted to a bi-level waveform through means of conventional differentiating, amplifying, and waveshaping circuits or through logic circuits responsive to the transition of a signal.

Figure 3:
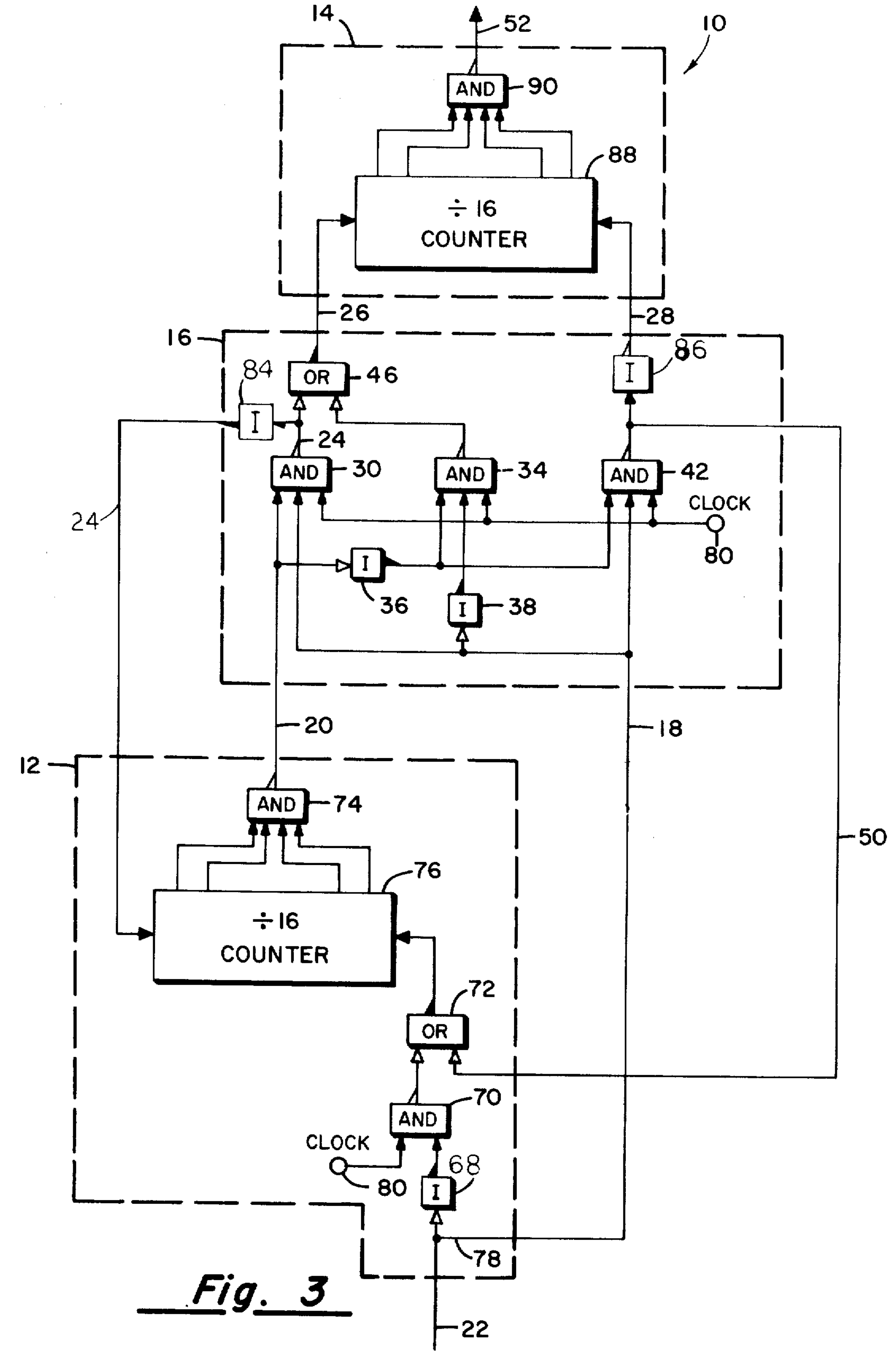
FIG. 3 is a detailed logic diagram of the embodiment of the invention illustrated in FIG. 1.

Referring now to FIG. 3, a detailed logic diagram of the basic logic diagram of FIG. 1 is shown. The detailed drawing adds only an inverter 68, an AND gate 70, an OR gate 72, and another AND gate 74 to the detection register 12. The AND 74 has as its inputs the four outputs from each of the four bit positions of a divide by 16 counter 76 to provide as its output the collective state of the N−1 "preceding" bits registered in the counter.

For the illustrated embodiment, the Nth bit registration from register 12 is provided by a lead 78 interconnecting data line 22 and output lead 18. Bits from data line 22 are gated into divide by 16 counter 76 through AND gate 70 and OR gate 72 under control of a clock pulse applied to terminal 80 of the other input to AND 70. The register control logic 16 is nearly identical to that of FIG. 1, differing in that a clock input is provided for each of AND gates 30, 34, and 42, in that the input to AND 42 which is the inverted signal of lead 20 is derived from inverter 36, and in that inverters 84 and 86 are added. The clock inputs of the ANDS 30, 34, and 42 are coupled to a common terminal 80 which receives timing pulses from a clock (not shown). Provision of such clock pulses may be by any of numerous well known circuits which produce timing pulses and may be from a clock of the receiving device although if completely independent operation is desired a separate clock would be provided.

The sub-pattern counter register 14 comprises a summation AND gate 90 and another divide by 16 counter 88. Both of the divide by 16 counters, counter 88 and counter 76, are updated in response to a negative going signal transition. This feature combined with the use of appropriately timed high clock pulses applied to terminal 80 provide two phases from each clock pulse. To illustrate, assume that the signal of the waveform illustrated in FIG. 2 has been converted to a bi-level signal and applied to data lead 22, and further assume that the time is bit time T−1 which corresponds to a second state signal (a high level of the converted signal). With a second state signal on the line, line 22 is high to provide a high output on register 12 output lead 18 and satisfy one of the conditions for activating both of ANDs 30 and 42 and to disable AND 34 through the action of inverter 38. The high signal on lead 22 also disables AND 70 through the action of inverter 68, and thus prevents updating of divide by 16 counter 76.

As will shortly become apparent, because the preceding bit, bit T−2, was a second state bit, divide by 16 counter 76 is in a cleared state and thus AND 74 is inactive to provide a high output on lead 20 to register control logic 16. (In FIG. 3, the logic circuit input and output arrows respectively represent the input signal state required to activate the circuit and the signal state of the circuit output when activated. For example, an open input arrow indicates that a low input signal activates the circuit; and, conversely, a closed input arrow indicates that a high input signal activates the circuit. Similarly, open and closed output arrows signify that the associated circuit, when active respectively provides low and high output signals and, on data line 22 and on the register 12 output 18 and 20, a second state signal corresponds to a high signal and a first state signal to a low signal.) A high signal on lead 20, through the action of inverter 36, disables both of ANDs 34 and 42 but conditions AND 30 to be enabled by application of a high clock pulse from terminal 80 during bit time T−1. The output from the activated AND 30 is inverted by inverter 84 to apply a high signal to the clear input (actually two inputs tied together) of divide by 16 counter 76 to clear the counter. By clearing counter 76 with each second state bit, counter 76 counts each series of consecutive first state bits but does not combine the count of two series of first state bits separated by one or more second state bits. As a result, the counter is self-synchronizing. The pattern of M sub-patterns can be prefaced by a second state bit which is a synchronizing bit, to minimize the length of the special condition data, or, the full count of register 88 can be made one less than M. For other embodiments, for example an embodiment including a shift register in detection register 12, which would preserve a second state bit as the lead bit of a sub-pattern, such an extra bit would not be required as all N bits of a sub-pattern could be shifted into the register. A ring counter is an example of another embodiment which would not preserve second state bits. Returning now to consideration of the output of AND 30. The AND 30 active output is also applied to the inverting OR 46 to similarly clear divide by 16 counter 88. The foregoing described operation is repeated during bit time T. At bit time T+1, however, the signal state on lead 22 is a low or first state. The signal is inverted by inverter 68 to satisfy one of the conditions for activating AND 70. During the positive going phase of the clock pulse for bit time T+1, AND 70 is activated bo provide a low output which is coupled through and inverted by OR 72 and applied to the update input of divide by 16 counter 76 as a high signal. As previously stated, counter 76 is updated by a negative going transition. Consequently, the first state bit of bit-time T+1 is not registered in counter 76 until the trailing edge of the clock pulse at which time AND 70 is disabled resulting in a transition from a high to a low signal on the counter 76 update input. The clock pulse trailing edge therefore is effectively a second phase of the clock, the first phase corresponding to the leading edge or the high level of the pulse. This concept of a two phase clock is important to an understanding of the operation of the detector 10 because detection of the registration of a group of N bits in register 12 must be done before counter 76 registers the current state of data line 22. Each of ANDs 30, 34, and 42 are enabled by high signals at their inputs. Consequently, these ANDs, which perform the detection function, are enabled by the clock pulse leading edge or high portion (phase 1) of the clock signal and updating of the counter 76 doesn't occur until the clock pulse trailing edge phase 2 time of the clock. To complete description of the action taken during time T+1, the low signal on data line 22 and hence on lead 18 disables both of ANDs 30 and 42 but satisfies one of the conditions for enabling AND 34 as a result of inversion of the signal by inverter 38. The AND 34 will not, however, be enabled as the lead 20 output remains high. Following T+1 bit time, a count of one is stored in counter 76. The foregoing operation would be repeated for each of bit times T+2 and T+3, and for an additional twelve bit times for the illustrated embodiment. During the bit time following the last of the twelfth additional bit times (the 15th consecutive first state bit), counter 76 stores a full count and consequently AND 74 is active to provide a low signal on lead 20 representative that N−1 consecutive ones have been received and are registered in register 12. This bit time corresponds to the bit time T+4 of FIG. 2 and places a second state high signal on data line 22. As previously described, the low signal satisfies one of the conditions for activating ANDs 30 and 42 but disables AND 34. A low signal is on lead 20 from AND 74 and activates AND 42 after inversion by inverter 36. The active output of AND 42 is applied through inverter 86 via lead 28 to the update input of counter 88 and via lead 50 to the OR 72 of counter 76. At phase 2 time of the clock, counter 88 is updated. Counter 76 is also updated at phase 2 time, however, such updating amounts to clearing of the counter because the counter is a 16 sequence counter and the N−1 number of bits of the sub-pattern has been assumed to be only 15. The foregoing operations as described for bit times T+1 and T+4 would of course be repeated for consecutive sub-patterns until counter 88 reached its maximum count to provide an output, a low signal, on lead 52.

It is apparent from the foregoing description that detection of a special condition such as an initial load command can be readily effected merely by coupling data line 22 to a processor I/O channel, perhaps with signal conversion circuits of the type previously referred to depending upon the waveform of the signal carried on the channel, and by coupling the output lead 52 of sub-pattern counter register 14 to the circuitry by which an initial load operation is normally started.

It is understood that suitable modifications may be made in the structure as described and disclosed provided that such modifications come within the spirit and scope of the appended claims. Having now, therefore, fully illustrated and described my invention, what I claim to be new and desire to protect by Letters Patent is:

I claim:

1. A method of transmitting both important data representative of a special condition and normal data over the same communication path, which data representative of a special condition comprises a bit serial bit stream pattern, which pattern comprises M sub-patterns which are each N bits long and each of which sub-patterns comprises N−1 consecutive bits of a first state and one bit of a second state, wherein M and N are integer numbers and M is at least 2, comprising the steps of:

1. bit serially receiving and registering N consecutively received bits;
2. decoding each group of N consecutively received bits;
3. updating a sub-pattern counter in response to decoding a said group of bits corresponding to a sub-pattern and in response to decoding a said group of bits corresponding to a sub-pattern at an interval of N bit times subsequent to a prior decoding of a said subpattern.
4. clearing said sub-pattern counter in response to decoding a said group of bits inconsistent with a sub-pattern at an interval N bit times subsequent to decoding a said group of bits corresponding to a sub-pattern and in response to decoding a said group of bits corresponding to a sub-pattern at an interval less than N bit times subsequent to a prior decoding of a said group of bits corresponding to a sub-pattern.

2. A communication system for transmitting both data representative of a special important condition and normal data over the same communication path, which communication system includes a transmitter for generating a bit serial bit stream pattern representative of a special condition, which pattern comprises M sub-patterns each of which are N bits long and each of which comprises N−1 bits of a first state and one bit of a second state, wherein M and N are both integer numbers and M is at least 2, comprising in combination:

1. a sub-pattern detection register for bit serially registering N consecutively received bits;
2. a sub-pattern counter register for counting registration of a sub-pattern in said detection register; and
3. register control means coupled to said detection register for decoding the N bits registered in said sub-pattern detection register, which register control means is responsive to decoding registration of a said sub-pattern by said detection register to update the count of said counter register, is responsive N bit times subsequent to a said decoding of a registration to update and to clear said sub-pattern counter for decodings, respective, corresponding to and inconsistent with a sub-pattern, and is responsive to a decoding corresponding to a said sub-pattern at an interval less than N bit times subsequent to a prior decoding of a sub-pattern registration to clear said sub-pattern counter register.

3. A receiver for receiving both important data representative of a special condition and normal data from the same communication path, comprising, in combination:

A. normal data receiving means for bit serially receiving a bit stream of data from a data path, and for responding to a said bit stream corresponding to normal data; and B. special condition data receiving means for receiving a bit stream of data from said data path and for producing a signal representative of a special condition in response to a said bit stream of a pattern which comprises M sub-patterns each of which are N bits long and each of which comprises N−1 consecutive bits of a first state and one bit of a second state, wherein M and N are integer numbers and M is at least 2, wherein said special condition data receiving means includes a sub-pattern detection register for bit-serially registering N consecutively received bits of a bit stream and for providing a first output representative of the state of the Nth bit of said N bits and for providing a second output representative of the collective output of the other N−1 registered bits, which collective output is a said first state when said N−1 registered bits all are a first state and is a second state when any one of said N−1 registered bits is a second state;

a sub-pattern counter register for counting a registration of a said sub-pattern in said detection register; and a register control means coupled to said detection register for decoding said detection register outputs and for updating said counter register when said outputs are anticoincident with said first output of a second state and said second output of a first state; and for clearing both said detection and said counter registers in response to decoding both said outputs as a first state and for clearing said counter register in response to decoding both said outputs as a second state.

4. A receiver according to claim 3 wherein said detection register comprises an N−1 count ring counter for registering said preceding N−1 bits and means for providing said data line state as said first output for registering said nth bit.

5. A receiver according to claim 4 wherein said detection register comprises an n bit shift register and said first output comprises the least significant bit of the shift register and said second output comprises the most significant bit of the shift register.

6. A receiver according to claim 3 wherein said special condition receiving means includes a sub-pattern detection register which registers the Nth bit of a sub-pattern as the state of said data path and having a sub-pattern detection counter having a length of N−1 bits and which updates its count in response to a said first state signal from said data path but clears its count in response to a second state signal from said data path whereby said special condition receiving means is responsive to a second state synchronization bit followed by M said sub-patterns to provide said signal representative of a special condition; and a sub-pattern counter responsive to the combination of a full-count of said detection register counter and an Nth bit registration of a second state to update its count.

7. A receiver according to claim 6 wherein said subpattern detection counter provides indications of N registered bits by providing a first output representative of the state of the Nth bit and a second output representative of the collective state of N−1 consecutive bits and further comprises control means responsive to a combination of a first output representative of said Nth bit having a second state and said N−1 consecutive bits having a second state to apply a clear signal to said subpattern detection register counter.

8. A receiver according to claim 6 wherein said control means is responsive to the combination of said first output and said second output both of a first state, to clear both said detection register counter and said subpattern counter.

* * * * *